(No Model.) 2 Sheets—Sheet 2.

C. KIESER.
MEAT CUTTING MACHINE.

No. 303,248. Patented Aug. 5, 1884.

UNITED STATES PATENT OFFICE.

CHARLES KIESER, OF BALTIMORE, MARYLAND, ASSIGNOR OF ONE-HALF TO PAUL KIESER, OF ST. LOUIS, MISSOURI.

MEAT-CUTTING MACHINE.

SPECIFICATION forming part of Letters Patent No. 303,248, dated August 5, 1884.

Application filed July 28, 1883. (No model.)

*To all whom it may concern:*

Be it known that I, CHARLES KIESER, a resident of Baltimore city, Maryland, have invented certain new and useful Improvements in Meat-Cutting Machines, of which the following is a specification, reference being had to the accompanying drawings, forming part hereof, in which—

Figure 1:
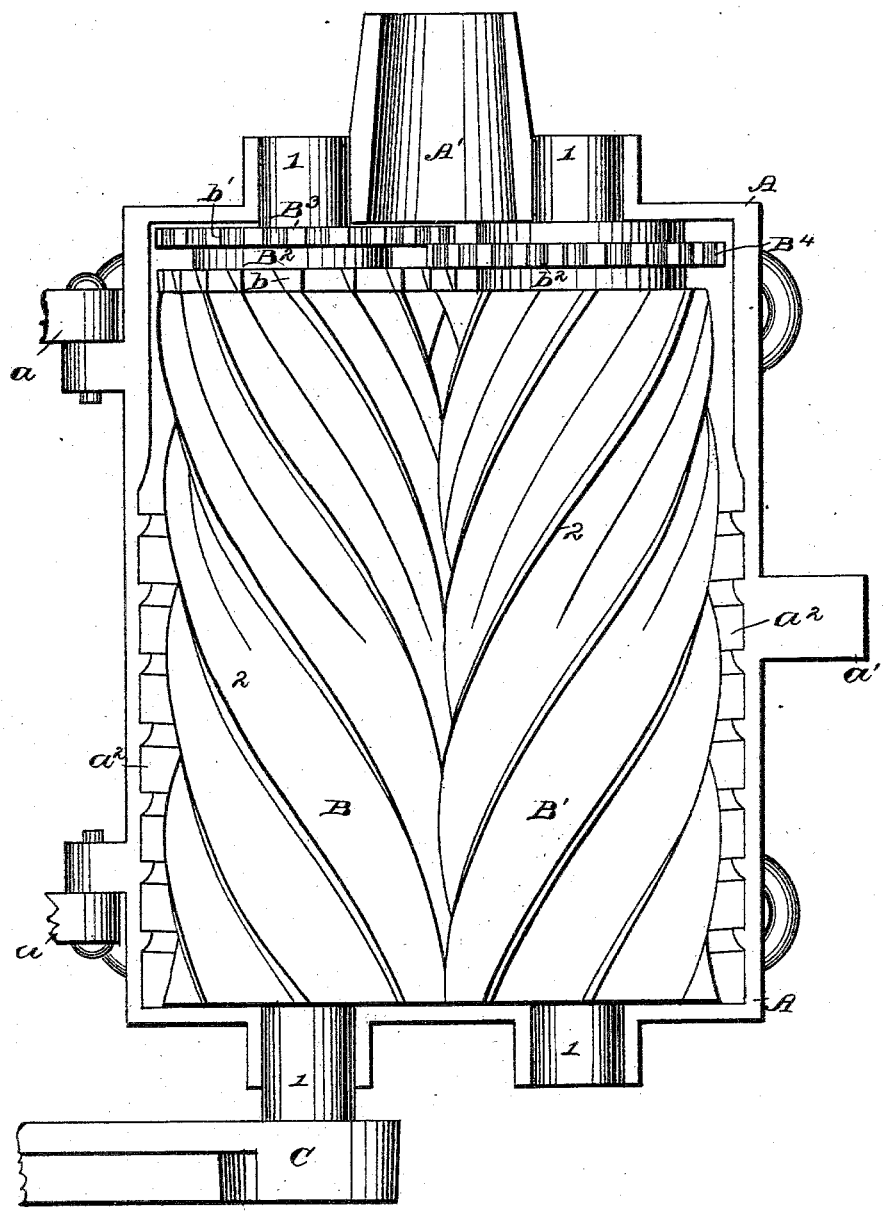
Figure 2:
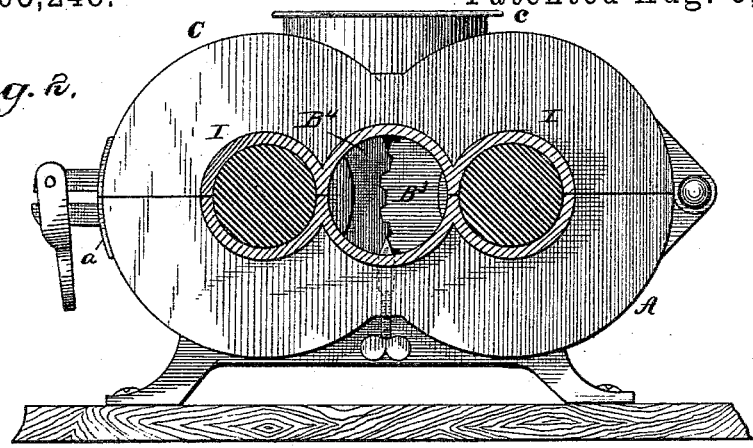
Figure 3:
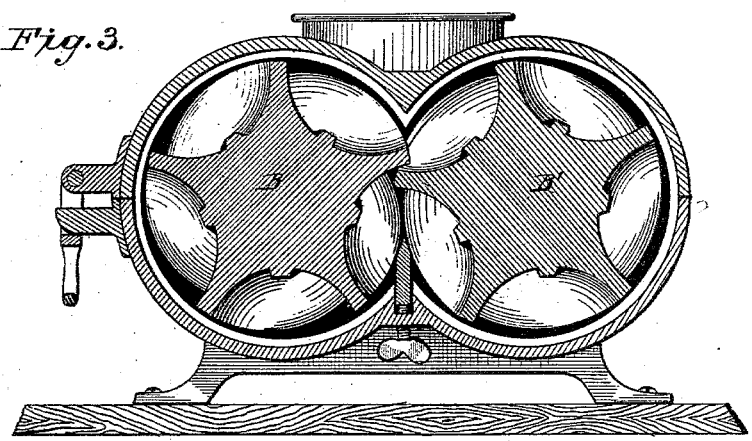
Figure 4:
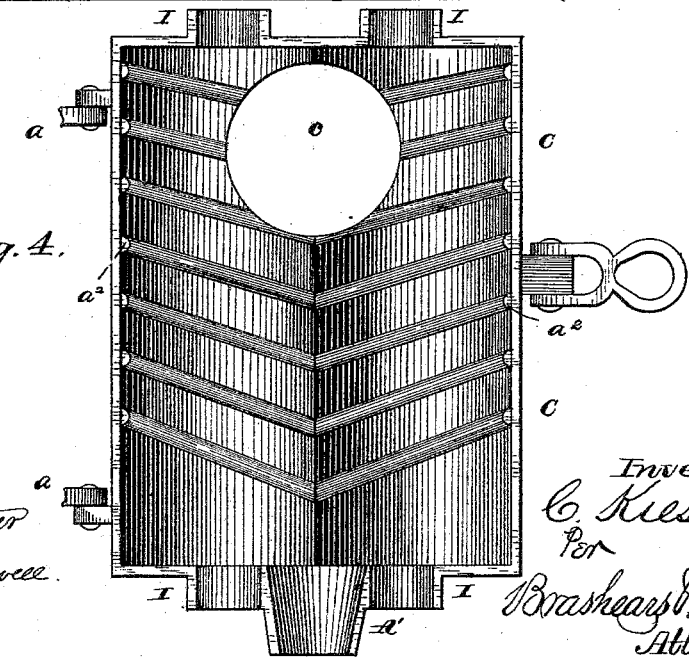

Figure 1 represents a top view of a meat-cutting machine with my improvements attached, the cover or top being removed to expose the working devices. Fig. 2 is a sectional view transversely of the spout and the shafts of the spiral cutters, showing the manner in which the transverse cutters engage each other. Fig. 3 is a transverse section through the center of the machine, and Fig. 4 is an inverted plan view of the top or lid of the machine.

Like letters refer to like parts in the several views.

My invention relates to machines for cutting sausage and other meats; and the object of my invention is to cut the meat transversely after it has been cut longitudinally, whereby the meat is discharged from the machine in a finely-divided mass.

My invention consists in the combination, with spirally-fluted feeding cutter-rolls, of cutters for dividing the meat arranged at the end of the spiral.

My invention further consists in certain details of construction and arrangement hereinafter described.

Referring to the drawings, A designates the body of the casing, which is formed with a concave bottom, upon the upper side of which are formed projections or ribs $a^2$, extending transversely of the body A. The top or lid C has a like interior construction, the ridges meeting when the lid is closed down, forming a continuous spiral groove within the closed box. The bottom is also preferably formed with a central longitudinally-extending knife, D, (see Fig. 3,) dividing the bottom into two longitudinal concave compartments, as is usual in this class of machines. The ribs $a^2$ extend somewhat obliquely across the bottom of the body, as shown, in order to increase the resistance of the meat as it is fed along through the machine. $a$ are the hinges, to which the lid or cover is attached, and $a'$ indicates the point at which the cover is secured when closed. At one end of the body is a discharge opening or spout, A', through which the divided mass of meat is delivered. A feed-opening, through which the meat to be cut is introduced into the machine, is provided at any suitable point, as at $c$, Fig. 4.

Lying parallel with each other and longitudinally of the body A are two feeding-rolls, B B', the extremities of which are journaled, by reduced portions 1, in bearings in the ends of the body or casing, one of said reduced portions upon the roll B being extended out beyond its bearing, and carrying a crank, C, or other suitable device, by which the roll B is revolved. The peripheries of the rolls are formed with spiral flutings, the edges of which are knife-like, as indicated at 2. The knife-edges of the one roll intermesh with those of the other roll, and thus serve to transmit the movement of the one roll to the other.

Upon the roll B at its end contiguous to the discharge end of the body A are rigidly mounted two disks, $B^2$ $B^3$, in such manner as to leave a space between their proximate sides. Upon the corresponding end of the roll B' is rigidly mounted a single disk, $B^4$, the periphery of which at the cutting-line is inclosed by the peripheries of the disks $B^2$ $B^3$. The periphery of the disk $B^2$ is formed with cutting-teeth $b$ arranged in alignment with the ends of the spirals 2, and with the spaces between said teeth registering with the spaces between said spirals. The rear sides of the cutting-teeth $b$ are formed obliquely, so as to be in line with the trend of the spirals, as shown. The disks $B^3$ $B^4$ are formed on their peripheries with cutting-teeth $b'$ $b^2$, respectively, which teeth may be similar to those upon the disk $B^2$, or similar to the teeth commonly employed for like purposes.

The operation of the above machine is quite apparent from the above description and drawings. The meat is first cut longitudinally by the spiral cutters and longitudinal knife D, and the divided mass is fed forward between the disks, where it is cut transversely, the mass being thus finely divided, and then the meat is forced out through the discharge opening or spout, (see Fig. 2,) being compelled in passing out to pass between the transverse cutters, and thus being finely cut transversely.

I am aware that the spirally-fluted rollers, arranged in the same relation as that in which I show them, are old, and I do not therefore claim them, except in combination with the cross cutters or disks.

Having thus described my invention, what I claim, and desire to secure by Letters Patent of the United States, is—

1. In combination, the spirally-fluted rolls B B', the longitudinal knife D, and the transverse cutters, arranged and operating as described.

2. In combination with the parallel spirally-fluted cutting and feeding rolls, the transverse cutting apparatus consisting of the toothed cutting-knives $B^2$ $B^3$ $B^4$, the knife $B^4$ being mounted at the end of one of the rolls, and the knives $B^2$ $B^3$ being mounted on the other roll in such relation to the knife $B^4$ that they inclose the periphery of the same, thus effecting a clean shear cut, as set forth.

3. In a meat-cutting machine of the class described, the combination of the spirally-fluted feeding cutter-rolls with the transversely-dividing cutters $B^2$ $B^3$ $B^4$, the cutter $B^2$ having its teeth arranged in alignment with the spirals of the roll B, substantially as and for the purpose set forth.

In witness whereof I have hereunto set my hand in the presence of two witnesses.

CHARLES KIESER.

Witnesses:
S. BRASHEARS,
JOHN T. MADDOX.